(12) United States Patent
Sesselmann et al.

(10) Patent No.: US 7,038,338 B2
(45) Date of Patent: May 2, 2006

(54) DRIVE UNIT

(75) Inventors: Helmut Sesselmann, Steinach (DE); Matthias Hoffmann, Coburg (DE); Markus Schultz, Nuernberg (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 26 days.

(21) Appl. No.: 10/276,431

(22) PCT Filed: May 15, 2001

(86) PCT No.: PCT/DE01/01910

§ 371 (c)(1),
(2), (4) Date: Nov. 15, 2002

(87) PCT Pub. No.: WO01/89063

PCT Pub. Date: Nov. 22, 2001

(65) Prior Publication Data

US 2004/0100155 A1 May 27, 2004

(30) Foreign Application Priority Data

May 16, 2000 (DE) ................................. 100 24 907

(51) Int. Cl.
*H02K 7/06* (2006.01)

(52) U.S. Cl. ....................................................... 310/83

(58) Field of Classification Search ................. 310/83, 310/82; 475/149, 341, 345
See application file for complete search history.

(56) References Cited

U.S. PATENT DOCUMENTS

| 3,374,372 | A | | 3/1968 | Tinder et al. |
|---|---|---|---|---|
| 3,879,623 | A | | 4/1975 | Miyake |
| 4,191,060 | A | | 3/1980 | Sessa |
| 4,503,732 | A | * | 3/1985 | Schust .......................... 74/625 |
| 5,272,938 | A | | 12/1993 | Hsu et al. |
| 5,479,058 | A | | 12/1995 | Seidou |
| 5,615,577 | A | * | 4/1997 | Chen .......................... 74/89.21 |
| 5,711,736 | A | * | 1/1998 | Kyodo ........................ 475/149 |
| 5,914,159 | A | * | 6/1999 | Kato .......................... 428/34.1 |
| 6,100,619 | A | * | 8/2000 | Buscher et al. ............... 310/99 |
| 6,198,184 | B1 | * | 3/2001 | Ohi et al. .................. 310/68 C |
| 6,477,918 | B1 | * | 11/2002 | Sakamoto ..................... 74/640 |
| 6,629,905 | B1 | * | 10/2003 | Sesselmann et al. ........ 475/149 |

FOREIGN PATENT DOCUMENTS

| DE | 2 210 243 | 9/1973 |
|---|---|---|
| DE | 27 58 874 | 10/1978 |
| DE | 28 31 774 C2 | 1/1980 |
| DE | G 91 16 261.0 | 11/1992 |

(Continued)

OTHER PUBLICATIONS

International Search Report of PCT/DE01/01910, dated Nov. 2, 2001.

(Continued)

*Primary Examiner*—Darren Schuberg
*Assistant Examiner*—Nguyen Hanh
(74) *Attorney, Agent, or Firm*—Christie, Parker & Hale, LLP

(57) ABSTRACT

A driving unit especially adapted to adjusting devices for motor vehicles having an electric motor, a gear box and an electronic control device. At least one element of the electric motor, for example, at the driving shaft, the magnetic short-circuit or the motor side crankcase casing, additionally provides a gear box mechanical feature and/or a mechanical member, for example, a gear box side crankcase casing, provides an electric motor or electronic control device feature.

37 Claims, 10 Drawing Sheets

FOREIGN PATENT DOCUMENTS

| | | |
|---|---|---|
| DE | 695 01 251 T2 | 2/1996 |
| DE | 296 22 874 U1 | 8/1997 |
| DE | 197 08 310 A1 | 9/1998 |
| DE | 197 51 861 A1 | 1/1999 |
| DE | 198 00 989 A1 | 7/1999 |
| GB | 1 390 316 | 4/1975 |
| JP | 10-327572 | 12/1998 |
| JP | 10-336996 | 12/1998 |
| WO | WO 99/39114 | 8/1999 |
| WO | WO 01/89063 | 11/2001 |

OTHER PUBLICATIONS

International Preliminary Examination Report of PCT/DE01/01910, dated Aug. 14, 2002.

Brockhaus-Lexikon: Naturwissenschaften und Technik, Band 2, 1989, Stichwort "Elektromotor", pp. 15-17.

Patent Abstracts of Japan for Publication No. 10-336996, Date of publication of application Dec. 18, 1998, in the name of Hiroshi Kataoka.

Patent Abstracts of Japan for Publication No. 10-327572, Date of publication of application Dec. 8, 1998, in the name of Toshikane Kaneki.

European Appeal Report, dated Mar. 22, 2005.

Brockhaus-Lexikon: Naturwissenschaften und Technik, Band 2, 1989, Stichwort "Elektromotor", pp. 15-17 (previously filed May 25, 2005; partial English translation only).

* cited by examiner

DRIVE UNIT

CROSS-REFERENCE TO RELATED APPLICATION

This application is a National Phase Patent Application of International Application Number PCT/DE01/01910, filed on May 15, 2001, which claims priority of German Patent Application Number 100 24 907.8, filed May 16, 2000.

BACKGROUND OF THE INVENTION

The invention relates to a drive unit for adjustment devices in motor vehicles with an electric motor, gearing and an electronic control device.

U.S. Pat. No. 5,272,938 describes a drive unit which has an electric disc rotor motor, and a gearbox formed as a reduction gearing, as well as a control device fed from a direct current voltage source wherein the housing of the disc rotor motor encloses the rotor disc, tablet-shaped permanent magnets and carbon brushes adjoining the rotor disc. Reduction gearing in the form of planetary gearing is integrated in an outwardly directed indentation of one of the two crankcase casings. An outer housing connected to the rotor of the disc rotor motor covers the housing of the disc rotor motor, the reduction gearing and a clutch so that the motor housing which encloses the electric motor is mounted inside the gearbox housing surrounding the gearbox thereby forming the housing of the drive unit.

The one crankcase casing of the motor housing receives a part of the reduction gearing and thus provides an additional mechanical function of the gearing but it also separates the electric disc rotor motor from the reduction gearing, but lined up with a double function of the one crankcase casing of the electric motor.

Through the double function of the one crankcase casing of the electric motor it is possible to make the drive unit particularly flat so that it can consequently be used as a hub drive for a cycle, but apart from the double function of the one crankcase casing of the electric motor only the common drive shaft is provided as one structural unit which is used both for the disc rotor motor and for the reduction gearing.

A drive unit with a reduction gearbox is described in DE 197 08 310A and is termed "harmonic drive gearing" and is located inside a rigid support ring which has a cylindrical internally toothed supporting area and an externally toothed radially flexible rolling bush. The rolling bush is elliptically deformed through a suitable drive device which consists inter alia of a planetary wheel unit mounted inside the rolling bush and having a sun wheel mounted on a drive shaft and driven by same, whereby the teeth of two planetary wheels engage in the external toothing of the sun wheel at two opposite places. The internal and external toothing differ by one tooth or several teeth. The toothed rim of the radially flexible rolling bush is pressed by the elliptically formed inner core of the drive unit into the cylindrical internally toothed supporting face of the rigid support ring.

As a result of the different number of teeth in the supporting surface and rolling bush a permanently continuous off-set stagger is produced between the interengaging circumferential sections so that one complete revolution of the drive shaft only causes the rolling bush to move on by the proposed difference between the number of teeth in the support ring and rolling bush. A very high reduction can thereby be achieved with a harmonic drive gearing of this kind.

DE 28 31 774 C2 describes an electric motor having a disc rotor in whose flat air gap an iron-free stator winding is mounted which is associated at least on one side with a permanently magnetized ring with axially magnetized segments and on both sides with soft magnetic flat discs for the magnetic short circuit. An electrodynamic tachogenerator is mounted coaxial with the rotor shaft so that the most compact unit possible is produced for the electric motor and tachogenerator.

The known unit of electric motor and tachogenerator consists of coaxial function elements of the electric motor and tachogenerator arranged in a row side by side wherein each unit is fully capable of functioning per se when the individual function elements are separated from each other.

SUMMARY

The object of the present invention is to increase the level of integration of the drive unit mentioned at the beginning through multiple functions of the component parts of the electric motor and the gearbox of the drive unit and thus to reduce the structural volume and weight of the drive unit, the number of component parts required and thus also the production costs which are made up of the structural parts and assembly costs.

The solution according to the invention makes it possible to allocate multiple functions to component parts of the electric motor and the gearbox of the drive unit which are subject to different functional and/or static stresses so that it is not component parts which are similarly stressed and which fulfil coinciding functions which raise the degree of integration but component parts used in different functions and static stresses. Through this measure the integration possibilities are clearly increased since the structural conditions need be taken into less consideration when mounting the electric motor and the gearbox than in the case of component parts which are subjected to functionally and/or statically similar stresses.

More particularly the solution according to the invention is characterised by the following properties:

minimal number of parts, minimal weight and volume through a high degree of integration of the drive components electric motor, electronics, sensor system and mechanical component parts as well as possibility of increasing the level of integration through incorporating the drive unit in a base part, such as door module, support plate or the like; low production costs;

dispensing with a separate gear housing and electronics connections as well as the need for providing for right and left housings;

possibility of installing the drive unit in any angular position and providing a single assembly plane and thus a variable use, particularly for adjustment devices;

widest possible interboxing of component parts of the electric motor and gearbox and thus obtaining a low structural depth of the drive unit.

The solution according to the invention provides with the minimal number of parts, minimal weight and volume of the drive unit, an extremely high degree of integration of the individual drive components of the drive unit which are no longer arranged in a row independently of each other but are linked together so that when separating the drive components each individual part of the drive unit would be no longer able to function, that is that in particular with the omission of a motor element the gear would be incapable of functioning and with the omission of a gear element the motor would be incapable of functioning. The structural space available for housing the drive unit is thus utilised in optimum manner.

Furthermore the solution according to the invention guarantees a variable use of the drive unit since separate gear housing and electronics connections, like the need for providing right and left hand housings are unnecessary and installation of the drive unit in any angular position is possible. Reducing the number of parts and as a result of the high degree of integration as well as providing a single assembly plane all contribute to lowering the production costs of the drive unit.

To output maximum torque the gear integrated in the drive unit is formed as a reduction gearbox, more particularly as a revolving wheel gear in the form of a cyclo, Wolfrom, planetary, tumbler or harmonic drive gearbox.

Suitable electric motors are direct current and alternating current motors of flat construction with mechanical or electronic commutation, more particularly disc rotor motors.

The electric motor formed as a disc rotor can consist selectively of a mechanically commutated motor with a rotor disc supporting the electric windings and the collector, a stator supporting the at least one permanent magnet, and a commutating device connected to the housing shell on the motor side, or of an electronically commutated motor with a disc like permanent magnet rotor and fixed exciter coils.

The use of an electronically commutated motor is particularly advantageous in the case of a 42 volt mains network since electronically commutated motors can be connected in a particularly advantageous manner with flat built gearboxes of the cycle or harmonic drive principle.

When using an electronically commutated motor the fixed exciter coils can be mounted on one or on both sides of the disc like permanent magnet rotor.

The rotating permanent magnet rotor guarantees the shortest flow paths for the magnetic circuit and consists in particular of a combination of a support material of plastic or light metal with embedded permanent magnets. These are particularly formed as sintered or injected neodymium iron bore magnets wherein the injected neodymium iron bore magnets are made using the twin-component technology and are a direct constituent part of the permanent magnet rotor.

The high degree of integration of the drive unit according to the invention is reached inter alia in that at least one part of the components of the individual drive components, such as the disc rotor motor and the reduction gearbox, is supported on alternate sides, or serves as a supporting component for holding or supporting component parts of each other drive components or of an electronic control device; more particularly at least one component part of the electric motor, for example the drive shaft, the magnetic short circuit or the housing shell on the motor side additionally provides a mechanical function of the gearbox and/or a mechanical component part, for example the housing shell on the gear side provides a function of the electric motor or of the electronic control device. It is thereby reached that as a result of multiple functions by specific components the number of component parts required and the amount of material used can be reduced.

A significant component part for increasing the degree of integration of the drive unit represents the magnetic short circuit of the electric motor, more particularly a disc rotor motor. The magnetic short circuit can serve both as a supporting component part to hold different components of the drive unit and also for supporting and stabilizing drive components which can be correspondingly reduced in the mechanical inherent stability. Furthermore the magnetic short circuit can be used as a supporting element for holding retaining or fixing elements or for fixing the crankcase casings on the motor side and gear side or for attaching the drive unit on a base part such as support plate, door module or other support.

On the other hand the magnetic short circuit can be simplified for example by reducing its dimensions by integrating the drive unit into a base part so that the base part undertakes at least in part some mechanical supporting functions and in the case of a ferromagnetic design of the base part also serves as part of the magnetic short circuit path.

In particular the magnetic short circuit of an electric motor, more particularly a disc rotor motor, can serve in conjunction with a reduction gearbox to take up the internal teeth of a hollow wheel which is fixed relative to the housing. The integration of the internal teeth of the hollow wheel fixed relative to the housing into the magnetic short circuit can take place selectively in that either the magnetic short circuit directly supports the internal teeth of the hollow wheel fixed relative to the housing by for example milling, stamping or shaping in some other way the internal teeth into the inside ring face of a circular ring shaped magnetic short circuit, or by injection moulding the internal teeth of the hollow wheel fixed on the housing as plastic teeth on the magnetic short circuit.

Injection moulding the plastic teeth can be carried out by injection moulding the internal teeth on a retracted spline formed on the surface of the magnetic short circuit, that is the spline is shaped by a toothed core formed on the magnetic short circuit and the injected plastic which forms the actual toothed spline, or the internal teeth are injection moulded on the radial recesses and/or projections of the magnetic short circuit. In the last mentioned embodiment protrusions or indentations are formed on the inside face of the magnetic short circuit and serve to take up and fix the position of an injection moulded plastic toothed spline.

Furthermore the magnetic short circuit can contain means for locating and positioning the magnetic source of the electric motor which are connected tablet like, circular ring segment like or circular like to the magnetic short circuit and are formed on the magnetic short circuit. Alternatively a one piece assembly of the magnet source and magnetic short circuit is also possible by way of example by using hard and soft magnetic materials.

The magnetic short circuit preferably has after the fixing of the drive unit at least in part a first contact with the door inner panel, door module or a support plate of a vehicle door and is only reinforced in the flow-conducting region.

As a further component for producing a high degree of integration of the drive unit, the drive shaft forms both the motor and gear shaft of the drive unit and in the case of a reduction gearbox formed as a planetary gearbox directly as the driving sun wheel and/or as the bearing seat for the web of the planetary gearbox and the revolving planetary wheels or rollers.

Furthermore the drive shaft can serve with the hub as a support for the energized armature disc of a slip ring rotor motor and as a bearing point for the cable drum of a window lifter drive.

In one embodiment of the invention the drive shaft is fixedly connected to a hub which is preferably comprised of a hub plate injection moulded on the rotor disc, and a hub cylinder surrounding the center region of the drive shaft. The hub plate can be fitted with axes spaced radially relative to the drive shaft for holding the planetary wheels which form the drive core of the reduction gearbox.

In a further embodiment of the invention the hub supports the rotor disc with the electric windings and the collector, preferably a flat collector.

The degree of integration of the drive unit according to the invention can be raised further if the crankcase casing on the motor side consists of a ferromagnetic material and itself is part of the magnetic short-circuit. As an alternative to this the crankcase casing on the motor side can be made of plastic and connected to a ferro-magnetic short circuit element. Furthermore the crankcase casing on the motor side can be an integral constituent part of a support element, for example a conductor plate, of the electronic control device or can be connected to the said electronic control device.

In a further development of the solution according to the invention the crankcase casing on the motor side supports the commutating device for the electric motor and/or a sensor unit for the drive unit.

Alternatively the rotor disc itself can be the transmitter for the various different sensors, for example optoelectronic or magnetic sensors.

A further aid to increasing the degree of integration of the drive unit is achieved if the gearbox side crankcase casing supports a bearing element whose inner region supports the comparatively fast-running drive shaft and whose outer region supports the comparatively slow running output hollow wheel, for example a cable drum for a cable window lifter of a motor vehicle, without interaction, that is without the appearance of mutual friction or bending influences as a result of the radial bearing strain through the cable drum or drive shaft.

In order to be able to use the drive unit with its high degree of integration according to the invention in wet and dry space areas, for example in a vehicle door without additional sealing expense, additional structural measures are provided in the integrated drive unit, such as for example a conical water drainage channel which is formed in the injection moulded plastic toothed spline of the hollow wheel of the reduction gearbox fixed on the housing and which sealingly adjoins an inner face of the output hollow wheel facing the electric motor. Through this measure it is possible for example to place the driven hollow wheel and the gearbox side crankcase casing as well as parts of the drive core in the wet space area of a vehicle door whilst the motor side crankcase casing, the rotor disc as well as the permanent magnets and bearing of the drive core can be mounted on the dry space side of the vehicle door.

Providing blade elements formed for example as rotating air guide blades in order to create an axial ventilator on the hub with which an air stream is drawn in from the dry space side of the drive unit and discharged to the wet space side of the drive unit through the driven hollow wheel and the crankcase casing on the gearbox side. Through this measure there is an air flow from the dry space (motor chamber) to the wet space (gearbox chamber) for cooling the electronic and motor components and the penetration of dampness and moisture is prevented.

In order to increase the smooth running, functional reliability and to generate high torque on the sides of the driven hollow wheel of the gearbox it is advantageous to use a reduction gearbox formed as a revolving wheel gearbox with a toothed radially flexible ring and having the following properties:

smooth running, high inner system damping, sound and vibration absorbing;

tolerance-compensating, free of backlash;

optimum transfer of different torque and speeds to the outside and inside of the radially flexible ring;

shape stable and permanently durable;

low friction;

transfer of large forces with small surface pressures (large number of teeth or force transfer faces in engagement, i.e. optimum engagement conditions).

When using the drive unit according to the invention for a cable window lifter of a motor vehicle the driven hollow wheel is formed as a cable roller and the gearbox side crankcase casing has openings for passing through the window lifter cable. Through these measures and through a variable suspension for the window lifter cable in the cable winding of the cable roller and through the direct connection between the Bowden supports and the gearbox side crankcase casing it is possible to provide variable exits for the window lifter cable and thus to fit the drive unit in any position relative to the cable guides on a support panel or in a door module.

Furthermore special cable mountings can be provided on the cable drum so that the window lifter cable can be hung at the end of assembly.

When using the drive unit according to the invention for adjusting devices in motor vehicles the drive unit can be connected to a base part such as a door module, support plate or the like so that the base part provides a mechanically stabilising or supporting function. Furthermore the ferro magnetic base part provides in part short circuit functions and serves when using semi conductor end stages to feed the electric motor as coolant body and/or discharge the latent heat of the electric motor. The last-mentioned possibility provides an additional protection against thermal overload of the electric motor and a reduction in the motor weight.

BRIEF DESCRIPTION OF THE DRAWINGS

The idea on which the invention is based will now be explained in further detail with reference to the embodiments shown in the drawings in which.

DETAILED DESCRIPTION

The drive unit illustrated in FIGS. 1 to 6 consists of the integration of an electric motor formed as a mechanically commutated disc rotor motor 1, and a reduction gearbox formed as a revolving wheel gearbox with a toothed radially flexible ring, as a drive unit for a cable window lifter. The high degree of integration of the drive unit is shown in particular by the sectional view in FIG. 1 and the gearbox parts of the reduction gearbox illustrated on a larger scale in FIG. 2, which illustrate the multiple functions of individual component parts of the drive unit.

Figure 1:
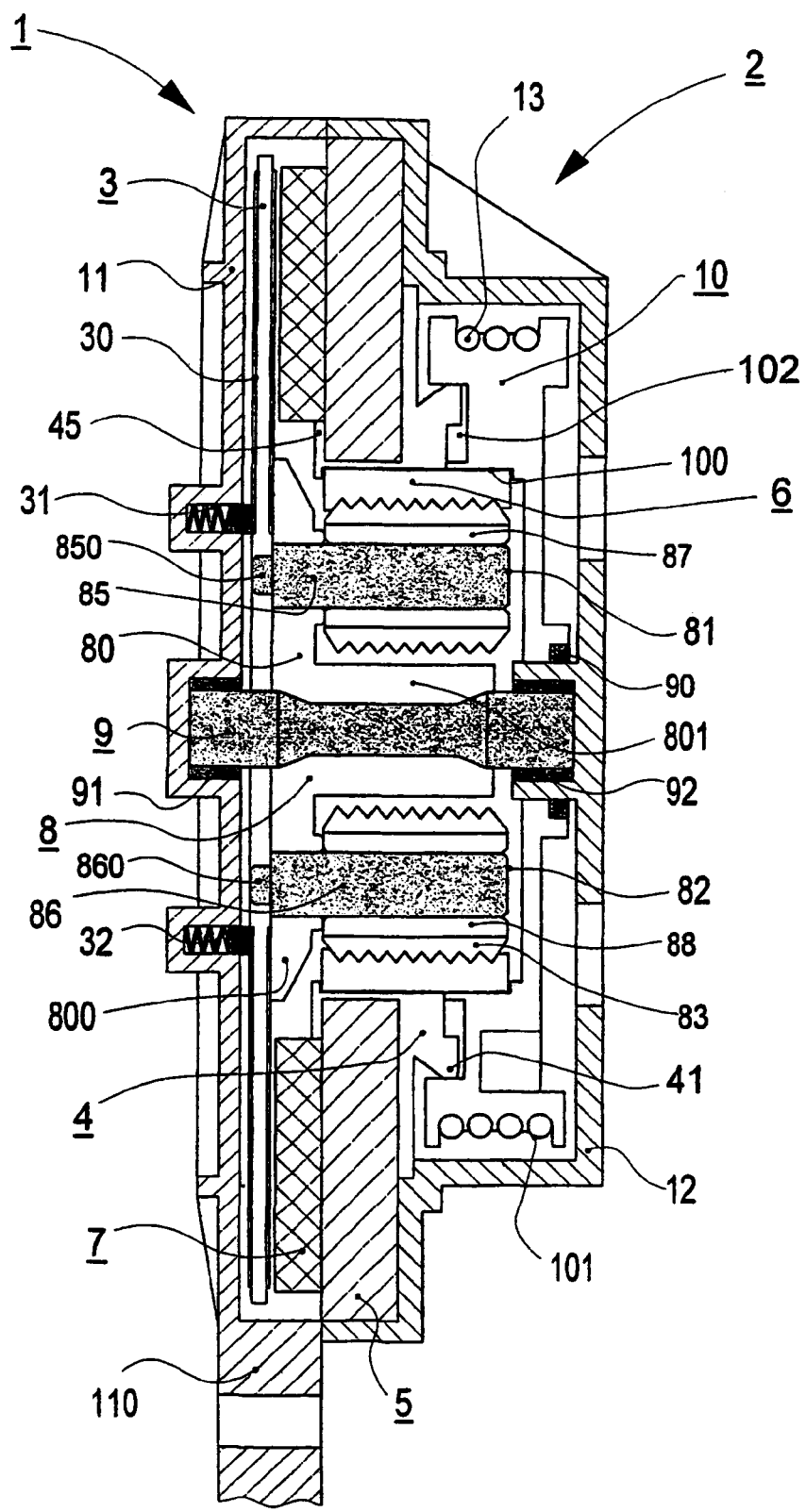
FIG. 1 shows a section through a drive unit with a mechanically commutated disc rotor motor and a reduction gearbox designed as a revolving wheel gearbox with a toothed radially flexible ring.
Figure 2:
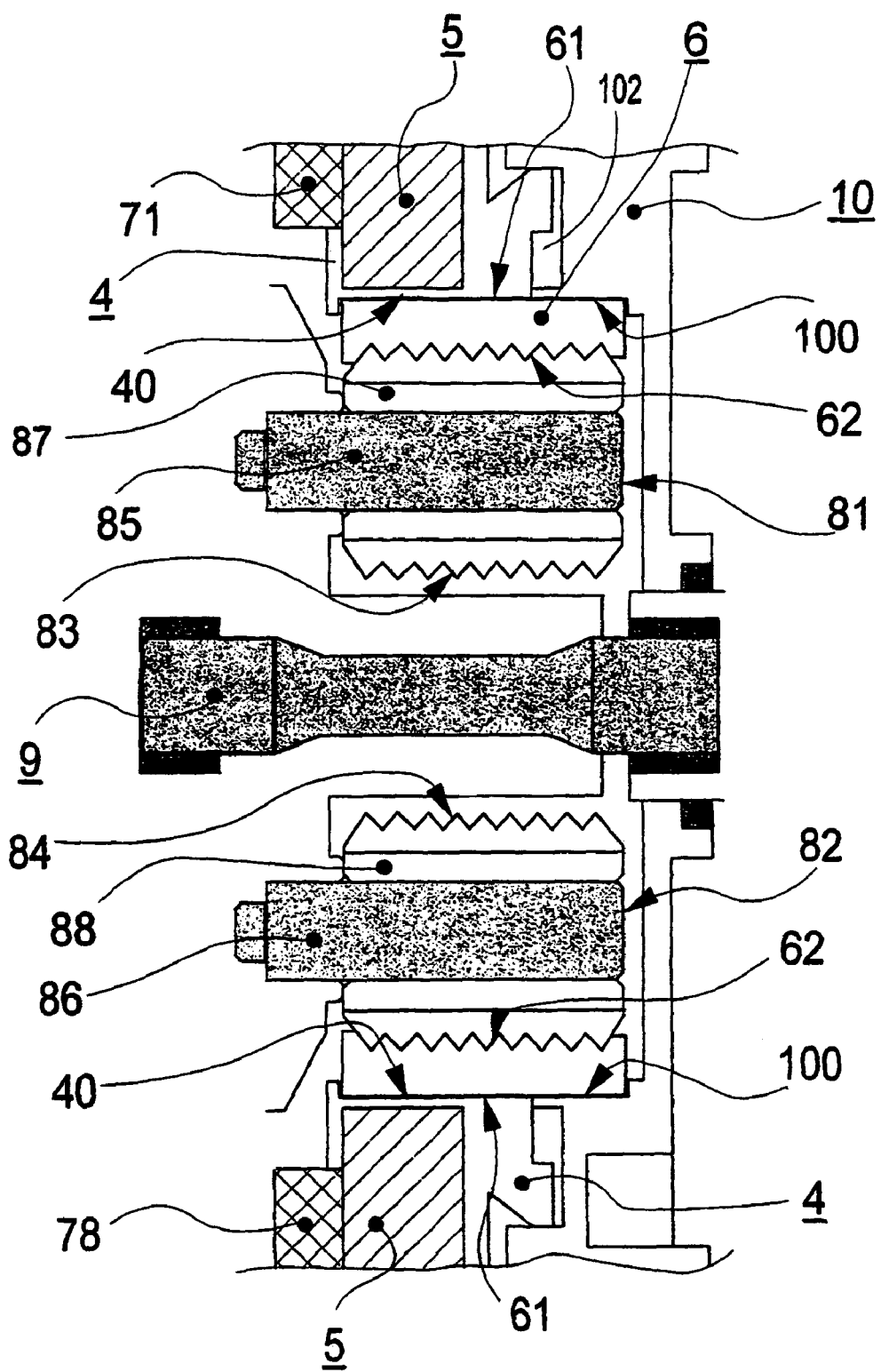
FIG. 2 shows an enlarged view of the gearbox parts of the reduction gearbox according to FIG. 1.

The component parts and functional elements of the mechanically commutated disc rotor motor 1 are the rotor disc 3 provided with the conductor loops 30, the brushes and brush springs 31, 32 mounted in the bearing points of a motor side crankcase casing 11, the permanent magnets 7 according to FIG. 1 and 71, 78 according to FIG. 2 serving as the magnetic source, as well as the magnetic short circuit 5.

The rotor disc 3 is connected to a hub 80 which consists of a hub plate 800 which adjoins the surface of the rotor disc 3 and of a hub cylinder 801 which encloses the drive shaft 9 which is fixedly connected to the rotor disc 3. The rotor disc is preferably injection moulded on the hub plate 800 which serves inter alia to increase the mechanical stability of the rotor disc 3. The motor side crankcase casing 11 preferably consists of a ferromagnetic material for forming a magnetic short circuit path.

The component parts and function elements of the reduction gearbox 2 are a hollow wheel 4 fixed on the housing and having an internally toothed spline 40, a radially flexible ring 6 which meshes by a part of its external teeth 61 with the internal spline 40 of the hollow wheel 4 fixed on the housing, a profiled section 83, 84 of a drive core 8 which engages with an internal sleeve face 62 of the radially flexible ring 6, and a driven hollow wheel 10 which engages by its inner spline 100 with a part of the external spline 61 of the radially flexible ring 6 and which in the illustrated embodiment is formed as a cable drum of a cable window lifter, as well as a gearbox side crankcase casing 12.

The drive core 8 is formed by the hub 80 which is connected to the rotor disc 3 and which has the planetary wheels 81, 82 which are spaced radially relative to the drive shaft 9 and whose axes 85, 86 are inserted in the hub disc 800 as well as by a collar 850, 860, in the rotor disc 3. The planetary wheels 81, 82 have a profiled ribbed wheel 83, 84 preferably made of rubber which is drawn onto a bearing sleeve 87, 88 preferably made of a sintered material of iron, bronze or an injection moulding plastic. The bearing sleeves 87, 88 are mounted rotatable on the axes 85, 86 of the planetary wheels 81, 82.

The profiled ribbed wheels 83, 84 of the planetary wheels 81, 82 are in engagement with a similar profiled inner sleeve face 62 of the radially flexible ring 6. The circumferential ribbed shape of the radially flexible ring 6 and the planetary wheels 81, 82 creates a radial tolerance compensation through a flexible geometry, prevents axial migration of the radially flexible ring 6 and ensures a highly smooth running of the reduction gearbox 2.

The hollow wheel 4 which is fixed relative to the housing is formed by a shaped plastic part 45 injection moulded on the magnetic short circuit 5 of the disc rotor motor 1 and supporting an internally toothed spline 40 which meshes with a part of the externally toothed spline 61 of the radially flexible ring 6. Differing from the hollow wheel 4 fixed on the housing and illustrated in this embodiment and formed as a shaped plastic part 45 with integral internal toothed spline 40 it is possible to injection mould the internally toothed spline 40 directly on the inside ring face of the magnetic short circuit 5 or to fit it on a recessed toothed spline formed directly in the magnetic short circuit 5, or to injection mould it as an internally toothed spline 40 of the hollow wheel 4 on other radially aligned recesses or projections of the magnetic short circuit 5.

The moulded plastic part 45 has an injection moulded water drainage channel 41 which by means of a sealing lip adjoins a radial wall of a recess 102 of the driven hollow wheel 10 and ensures that moisture cannot pass from the gearbox side of the drive unit into the motor side of the drive unit. Between the driven hollow wheel 10 and the moulded plastic part 45 of the hollow wheel 4 fixed on the housing there is additionally a hollow cavity for a seal which can be inserted in this cavity as a lip seal and which preferably acts as a non-return valve which seals when stationary and opens when running so that an air flow through this hollow cavity region is possible.

An air guide of this kind can be achieved if the hub 80 has blade elements for forming an axial ventilator with which an air stream is for example sucked in from the motor side (dry space side) of the drive unit and discharged through the driven hollow wheel 10 and the gearbox side crankcase casing 12 to a wet space side of the drive unit.

The fast running drive shaft 9 is mounted on the one side in a motor side bearing 91 of the motor side crankcase casing 11 and on the other side in a gearbox side bearing 92 of the gearbox side crankcase casing 12. The gearbox side bearing 92 supports on its external circumference a bearing 90 for the slow running driven hollow wheel 10 whose internally toothed spline 100 meshes with a part of the externally toothed spline 61 of the radially flexible ring 6. On its periphery the driven hollow wheel 10 has a spiral shaped groove 101 for holding a window lifter cable 13 which is guided through openings in the gearbox side crankcase casing 12 and which is connected through cable guide rollers to a drive for the window pane of a cable window lifter.

Figure 6:
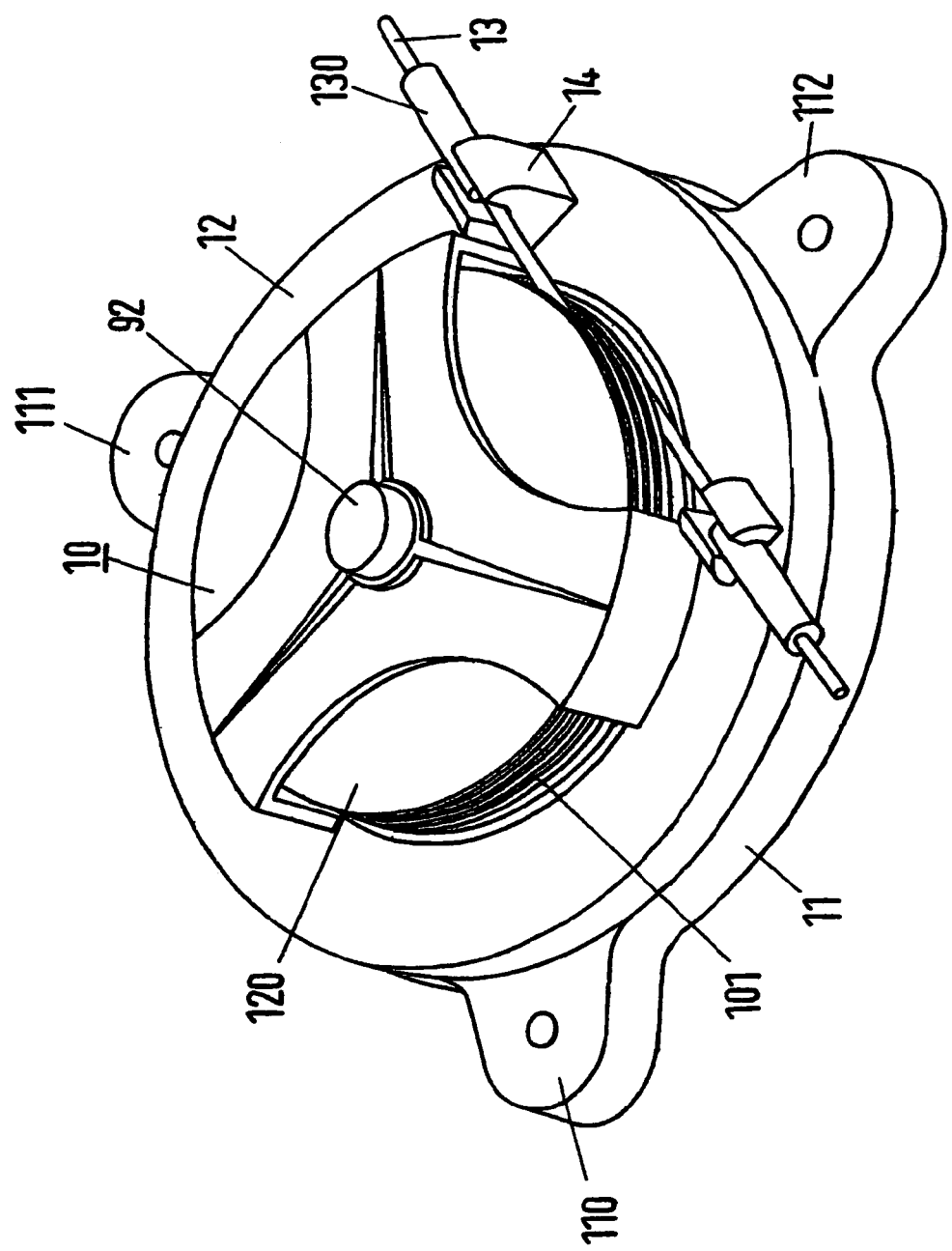

The connection between the drive unit and base part is provided according to FIG. 6 through several flanges 110, 111, 112 spread out round the circumference of the motor side crankcase casing 11.

The window lifter cable 13 is mounted outside of the drive unit according to FIG. 6 in a Bowden cable sleeve 130 which is mounted on the gearbox side crankcase casing 12 in Bowden cable supports 14 which can be arranged in variable manner on the gearbox side crankcase casing 12.

Figure 3:
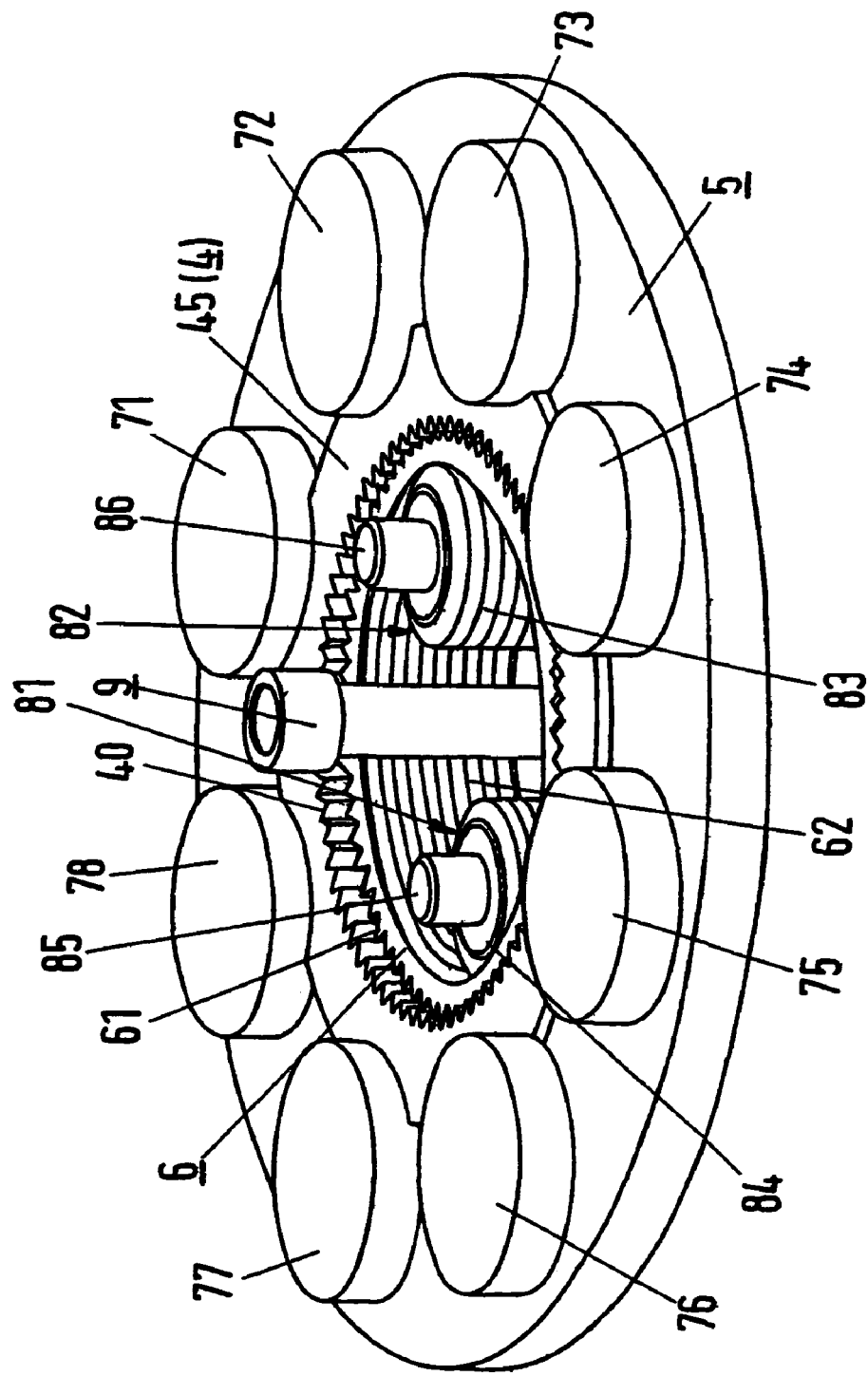
FIGS. 3 to 6 show diagrammatic perspective views of parts of the drive unit according to FIG. 1.

The perspective details shown in FIGS. 3 to 6 of the drive unit shown in FIGS. 1 and 2 illustrate the construction, functioning and association between the individual component parts of the drive components. Thus FIG. 3 shows an inclined view of the drive unit from the motor side with the magnetic short circuit 5 and the permanent magnets 71 to 78 with alternating polarity connected integral to the magnetic short circuit 5 and designed in tablet form. In the region of the inner ring face of the magnetic short circuit 5 the plastic moulded part 45 of the hollow wheel 4 fixed on the housing is connected to the magnetic short circuit 5, that is injection moulded on the inner ring face of the magnetic short circuit 5 or is fitted in the manner described above on the inner ring face of the magnetic short circuit 5.

The radially flexible ring 6 meshes by its external spline 61 with the internal spline 40 of the hollow wheel 4 fixed on the housing, and has on its inner sleeve face 62 a rib-shaped profile which engages with similar formed rib profiles 83, 84 of the planetary wheels 81, 82. The planetary wheels 81, 82 are mounted on the axes 85, 86 which are connected to the drive shaft 9 of the drive unit through the hub, which cannot be seen in this view.

Figure 4:
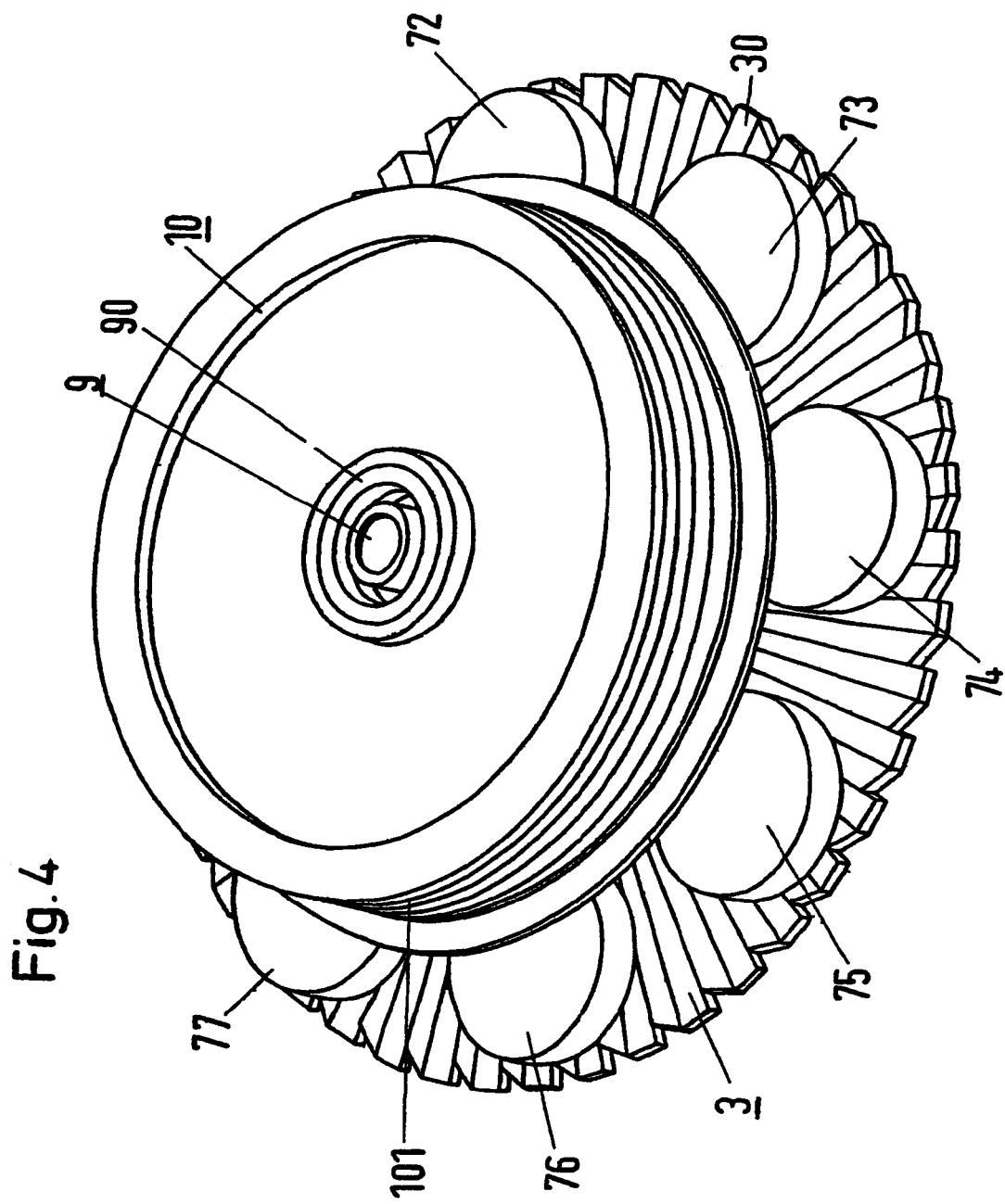

FIG. 4 shows a perspective inclined view from the gearbox side of the drive unit with the driven hollow wheel 10 formed as a cable drum with spiral-shaped cable guide groove 101 and mounted on the bearing 90 of the housing side bearing casing which holds the drive shaft 9 simultaneously in an inner bearing. This view shows the rotor disc 3 which is provided with conductor loops 30 and is located in the magnetic circuit and of which the permanent magnets 72 to 77 can be seen in the illustration according to FIG. 3.

Figure 5:
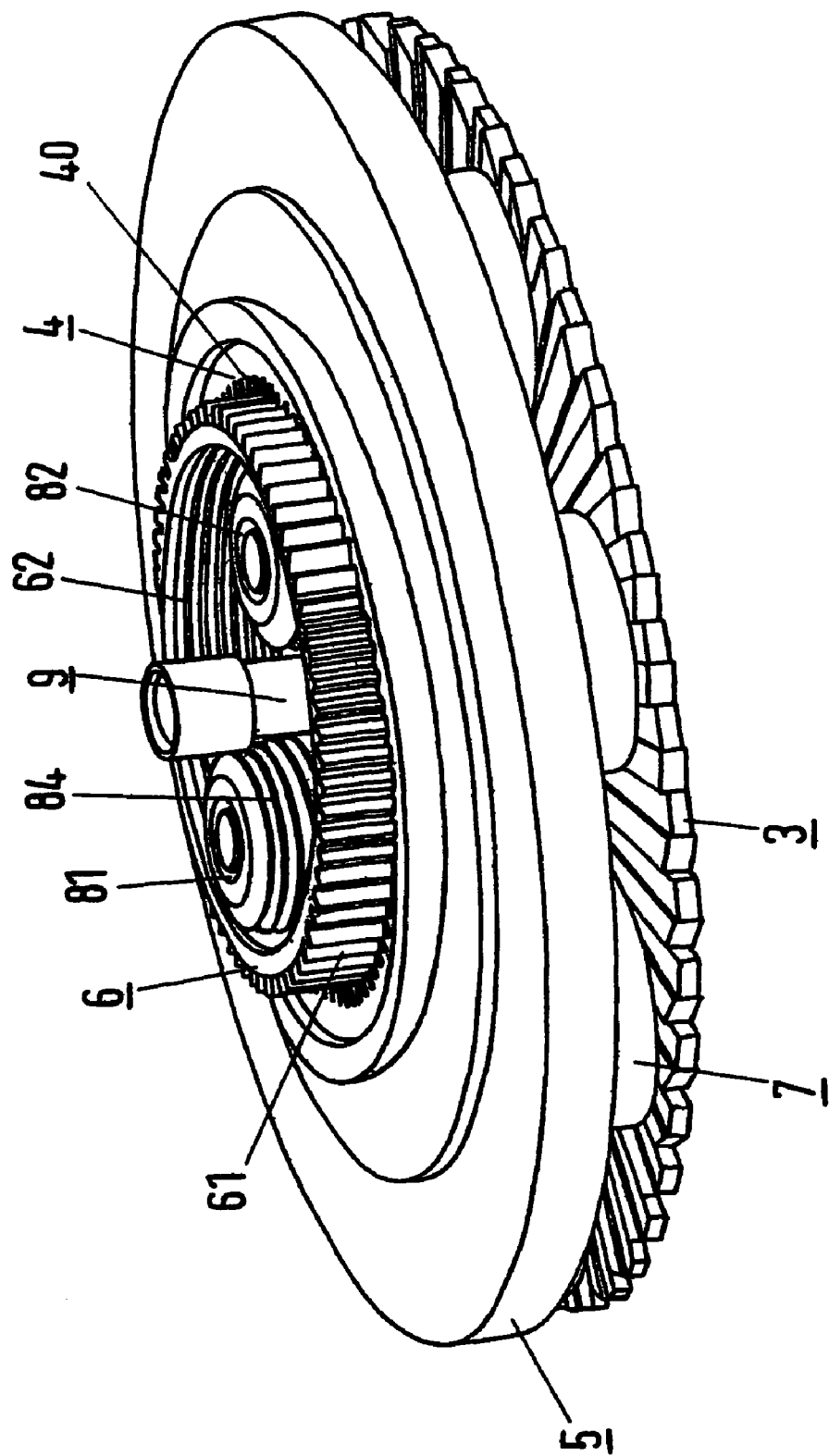

FIG. 5 shows a perspective side view of the drive unit with the rotor disc 3, the permanent magnet 7, the magnetic short circuit 5 as well as the radially flexible ring 6 whose external toothed spline 61 projects out for engagement with the internal toothed spline of the driven hollow wheel. The external spline 61 of the radially flexible ring 6 meshes in the illustration according to FIG. 5 with the internal toothed spline 40 of the hollow wheel 4 which is fixed relative to the housing and is injection moulded on the magnetic short circuit 5.

Inside the radially flexible ring 6 is the drive core with the planetary wheels 81, 82 whose profiled ribbed wheels engage with the ribbed inner sleeve face 62 of the radially flexible ring 6. Furthermore FIG. 5 shows the drive shaft 9 which is mounted with its end projecting out in this illustration in the gearbox side crankcase casing.

Finally FIG. 6 shows a perspective inclined view of the assembled drive unit. The motor side crankcase casing 11 has fixing flanges 110, 111, 112 for attaching to a base part and is connected for example by clip connections to the gearbox side crankcase casing 12. The gearbox side crankcase casing 12 has openings 120 which provide the access for the window lifter cable 13 to the spiral shaped cable guide groove 101 of the driven hollow wheel 10 formed as the cable drum. The window lifter cable 13 is guided in the Bowden cable sleeves 130 which are fixed on Bowden cable supports 14 which can be fitted anywhere round the circumference of the gearbox side crankcase casing 12. In the center of the drive side crankcase casing 12 is formed the bearing cover 94 for the bearing 92 for the drive shaft or cable drum or the driven hollow wheel 10.

Figure 7:
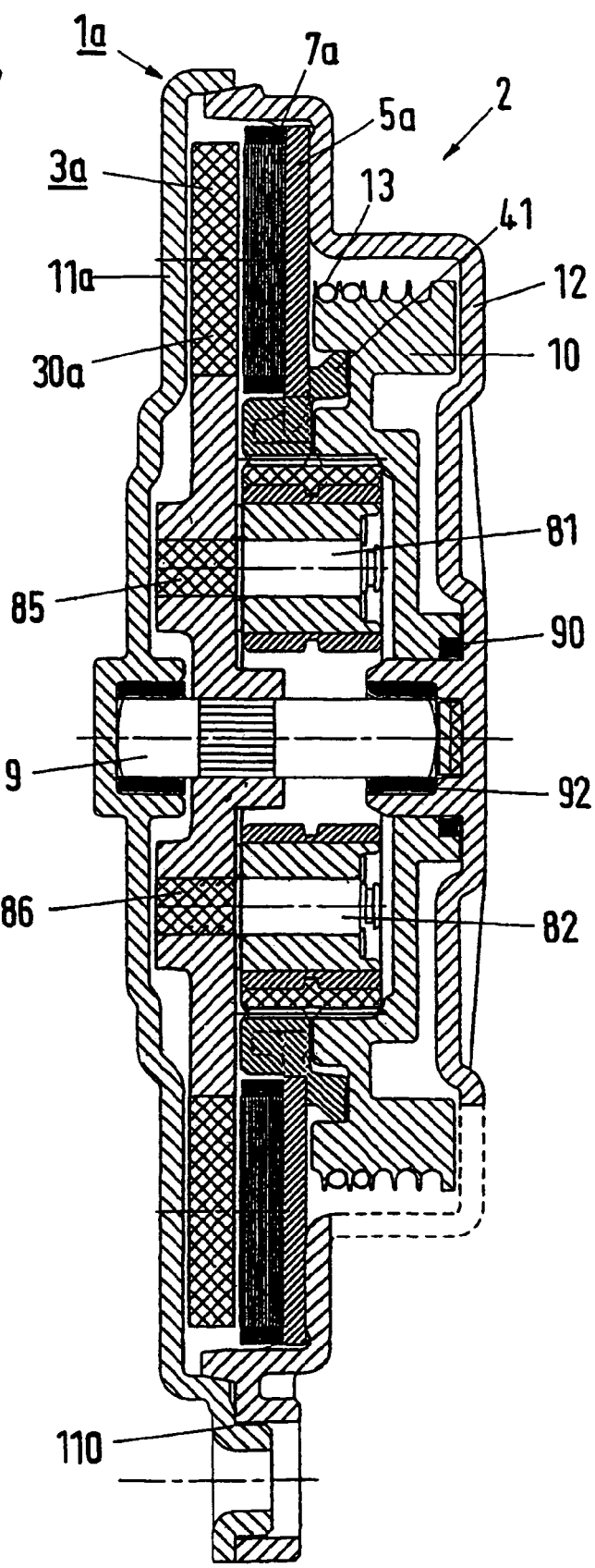
FIG. 7 shows a sectional view through a drive unit with an electronically commutated disc rotor motor with exciter coils fixedly mounted on one side and with a reduction gearbox formed as a revolving wheel gearbox with a toothed radially flexible ring.
Figure 8:
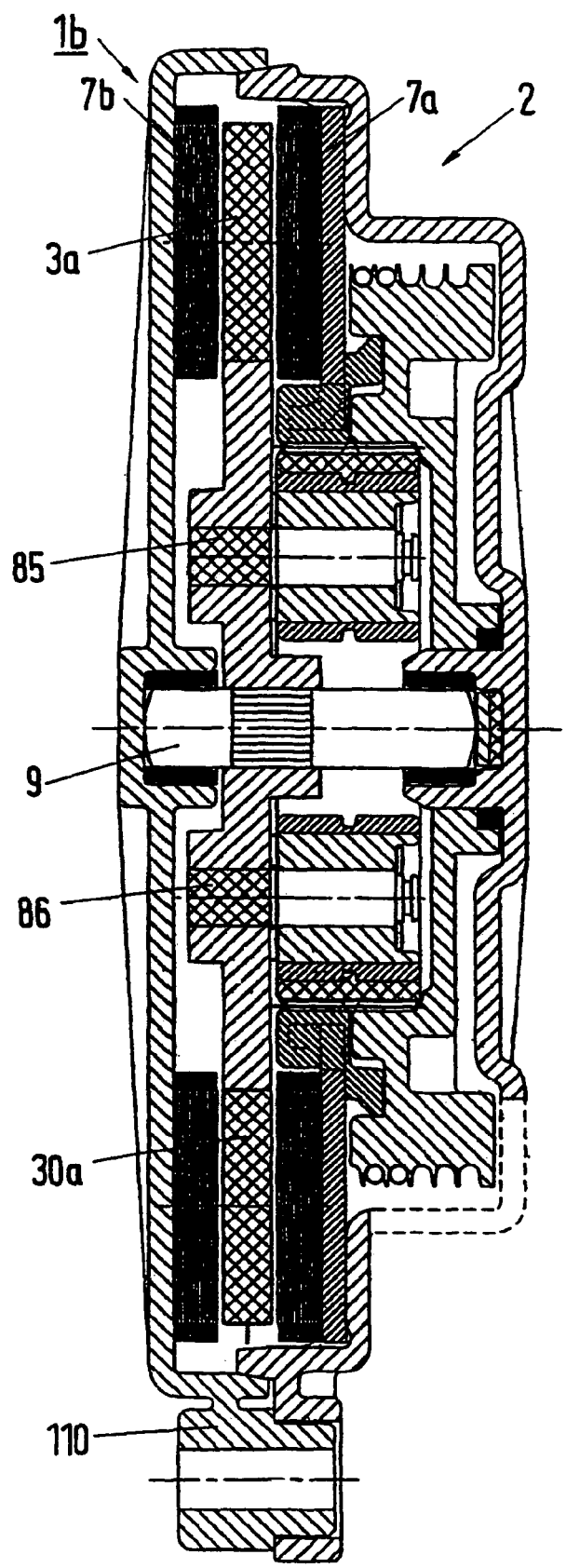
FIG. 8 shows a section through a drive unit with an electronically commutated disc rotor motor with fixed exciter coils mounted on both sides.

The drive unit illustrated in FIGS. 7 and 8 with an electronically commutated disc rotor motor 1a with integrated revolving wheel gearbox 2 differs from the drive unit illustrated in FIGS. 1 to 6 and described above in the configuration of the motor part as electronically commutated disc rotor motor 1a, which has a rotating permanent magnet rotor 3a as well as fixed exciter coils 7a so that the reference numerals used in FIGS. 7 and 8 coincide with the reference numerals of FIGS. 1 to 6 and consequently reference is made to the aforementioned description of the details relating to the revolving wheel gearbox 2.

The electronically commutated disc rotor motor 1a with integrated revolving wheel gearbox 2 is suited especially for higher voltage on-board power supplies and is to be connected with particular advantage to flat-built gearboxes based on the cyclo or harmonic drive principle such as the revolving wheel gearboxes illustrated in FIGS. 7 and 8.

In FIG. 7 fixed exciter coils are mounted on the side of the permanent magnet rotor 3a opposite the motor side crankcase casing 11a while in FIG. 8 a double-sided arrangement of the fixed exciter coils 7a and 7b is provided where the coils are mounted on both sides of the permanent magnet rotor 3a.

The rotating permanent magnet rotor 3a is in the two embodiments of FIGS. 7 and 8 a combination of a support material of plastic or light metal and permanent magnets 30a which are embedded in or connected to this support material. Sintered or injected neodymium iron bore magnets are preferably used which are manufactured using the twin component technology and form a direct constituent part of the disc rotor motor 3a.

The revolving wheel gearbox 2 corresponds in its details to the revolving wheel gearbox 2 illustrated in FIGS. 1 to 6 and described above wherein in this embodiment according to FIGS. 7 and 8 the bearing bolts or axes 85, 86 of the planetary wheels 81, 82 are incorporated particularly solid and stable in the rotating permanent magnet rotor 3a.

Figure 9:
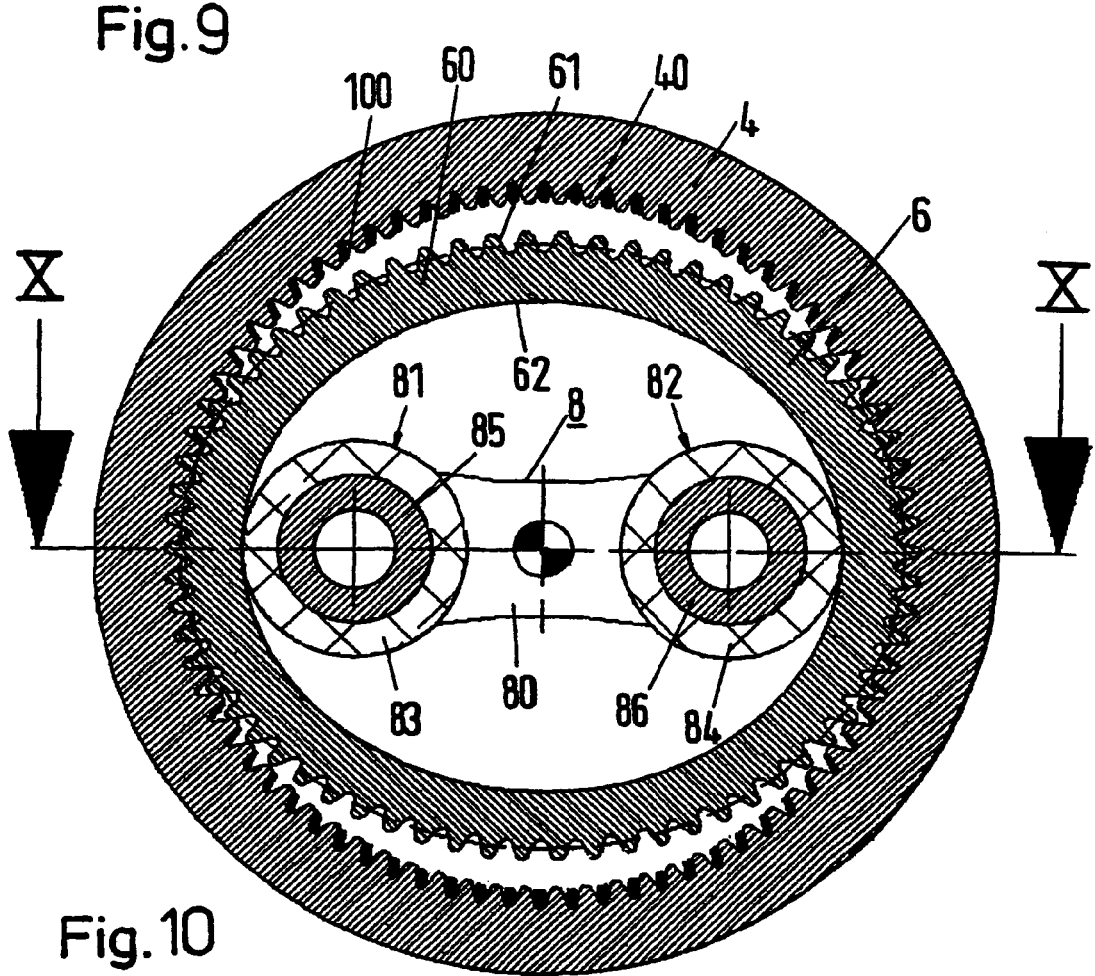
FIG. 9 shows a sectional view through a reduction gearbox formed as a revolving wheel gearbox with a toothed radially flexible ring.
Figure 10:
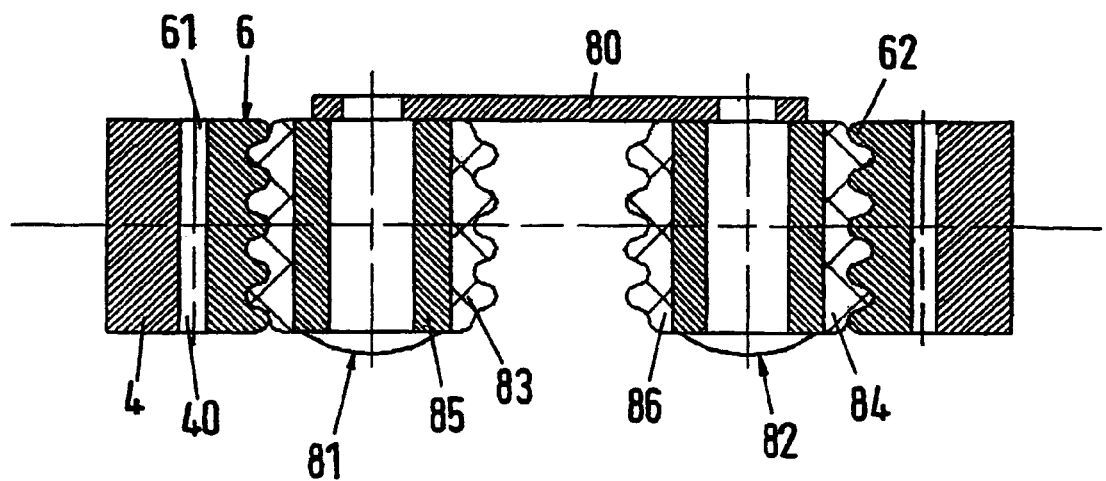
FIG. 10 shows a sectional view through the reduction gearbox according to FIG. 9 along the line X—X and FIG. 11 shows an exploded view of a drive unit in connection with a motor vehicle door as a base part seen in two different views.

FIG. 9 shows a cross section and FIG. 10 a longitudinal section through a reduction gearbox along the line X—X of FIG. 9 with a hollow wheel fixed on the housing with internally toothed spline 40 and with a driven hollow wheel aligned with the hollow wheel 4 fixed on the housing and lying behind this fixed hollow wheel in the viewing direction, whereby the internally toothed spline 100 of the driven hollow wheel is off-set by a different number of teeth relative to the internal teeth 40 of the hollow wheel 4 fixed on the housing. The externally toothed spline 61 of a radially flexible ring 6 whose inner sleeve face 62 is provided with a ribbed profile 62 which engages in profiled ribbed wheels 83, 84 of two planetary wheels 81, 82 forming the drive core 8 engages with the internally toothed splines 40, 100 of the hollow wheel 4 fixed on the housing and of the driven hollow wheel.

The planetary wheels 81, 82 have bearing sleeves 87, 88 preferably made of a sintered material such as iron, bronze or injected plastic, which are mounted rotatable on axes 85, 86 of the planetary wheels 81, 82. The axes 85, 86 are fitted on a web or a hub 80 which is connected to a drive shaft 9.

The core area or the support material of the radially flexible ring 6 can consist in this embodiment of an elastomer whose shape stability increases from the inner sleeve face 62 towards the external teeth 61, that is changes from a soft, tolerance-compensating and system-damping material into a harder but sufficiently flexible region of the external toothed spline 61.

The profiled ribbed wheels 83, 84 of the planetary wheels 81, 82 which engage with the profiled inner sleeve face 62 of the radially flexible ring 6 consist of rubber or a soft plastic for a high radial tolerance compensation through a flexible geometry wherein the ribbed structure prevents axial displacement of the radially flexible ring 6 and ensures an extremely smooth running of the reduction gearbox.

In order to increase the shape stability and durability as well as guarantee a high force and torque transfer the externally toothed spline 61 of the radially flexible ring 6 can be additionally coated with a hard material.

Figure 11:
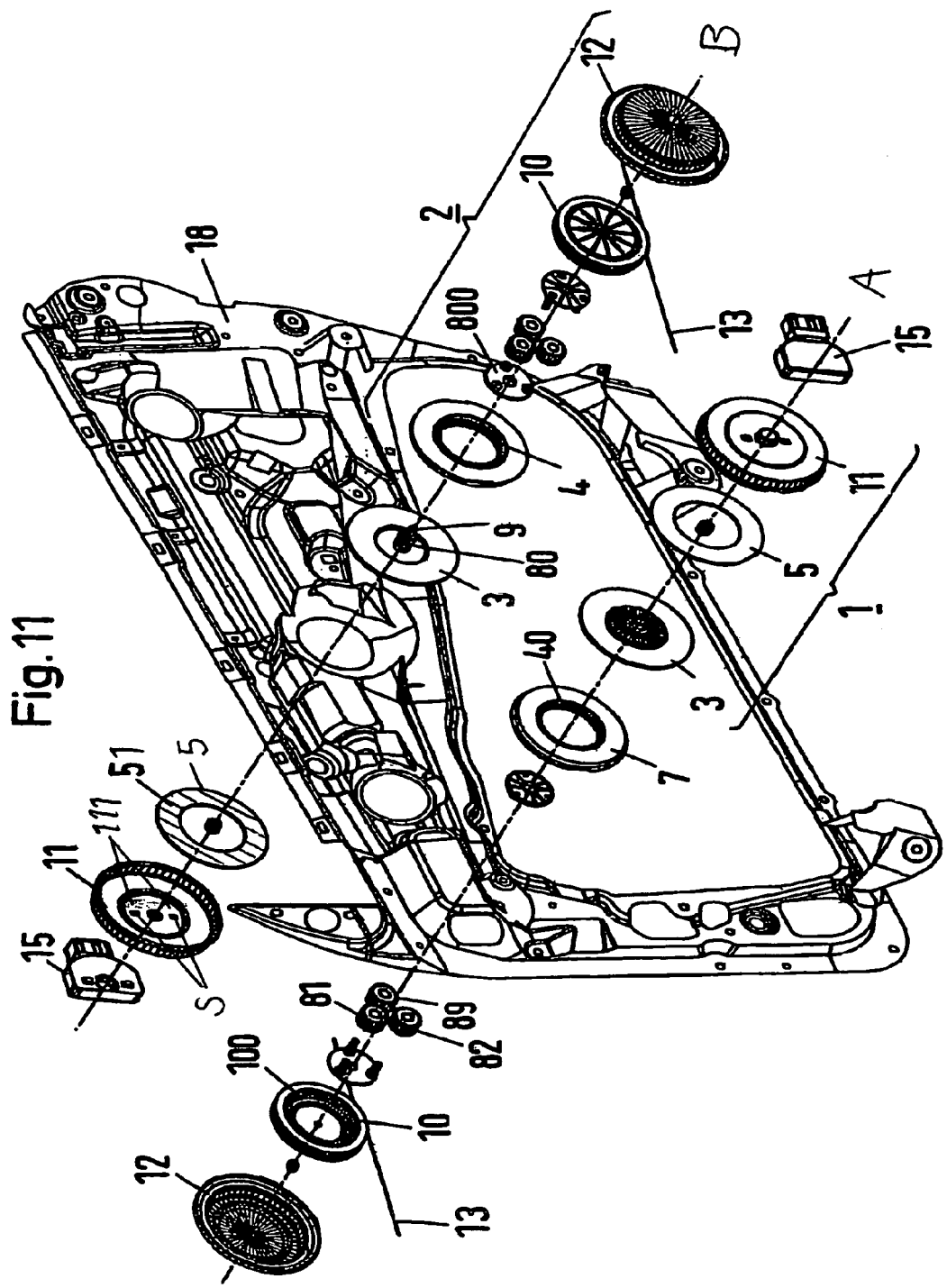

FIG. 11 shows an exploded view of a drive unit for a cable window lifter with disc rotor motor 1, planetary gearbox 2 with three planetary wheels 81, 82, 89, and an electronics unit 15 controlling the disc rotor motor 1, seen in two different views relative to a vehicle door 18 as the base part.

The disc rotor motor 1 and the planetary gearbox 2 are enclosed by two casing halves 11 and 12 which have openings for the entrance and exit of the window lifter cable 13. The electronics unit 15 contains inter alia the brushes (not shown) as well as sensors, e.g. for the speed or position of the disc rotor motor 1. It is thereby proposed that the electronics unit 15 and the disc rotor motor 1 be fitted on the dry space side, while the planetary gearbox 2 is located on the wet space side of the vehicle door 18.

In the dry space which is separated for example from the wet space by a support module (not shown) the electronics unit 15 is shown with the necessary connectors for the voltage supply, the brushes as well as the sensor devices for the position and speed of the disc rotor motor 1.

On the wet space side there are the remaining components of the drive unit, namely the planetary gearbox 2 and the driver hollow wheel 10. The motor side crankcase casing 11 contains openings 111 for sensors S and brushes which are contacted by corresponding elements in the electronics unit 15. On the side of the motor side crankcase casing 11 remote from the electronics unit 15 there is a magnetic short circuit disc 5, with a magnetic short circuit designed reinforced only in a flow-guiding region 51 thereof, the rotor disc 3 and the magnetic disc 7.

The motor side crankcase casing 11, the rotor disc 3, the magnetic short circuit disc 5 and the magnetic disc 7 with integrated short circuit and hollow wheel 4 fixed on the housing together make up the disc rotor motor 1 which is completed by the electronics unit 15 with the brushes. A drive shaft 9 is fixed on the rotor disc 3 and generates the transfer of the rotary movement to the planetary gearbox 2.

The drive shaft 9 supports a sun wheel 80 which is mounted or moulded rotationally secured thereon and which meshes with the three planetary wheels 81, 82, 89 which are mounted rotatable on a planetary support 800. The planetary support 800 itself is mounted rotatable on the drive shaft 9.

The planetary wheels 81, 82, 89 are thereby in engagement both with the internally toothed spline 40 of a hollow wheel 4 fixed on the housing and with the internally toothed spline 100 of a driven hollow wheel 10 formed as a cable drum, and as a result of the rotatable bearing of the planetary support 800 revolve round on the internally toothed splines 40 and 100.

The window lifter cable 13 which is guided in a spiral shaped groove round the outer circumference of the driven hollow wheel 10 is looped round said driven hollow wheel 10.

In the embodiment illustrated in FIG. 11 the door inside panel, door module or the support plate of the vehicle door forms the base part 18 and—as explained above—can be incorporated as a support or stabilizing element as well as a magnetic short circuit into the structure of the drive unit.

With the embodiment illustrated in FIG. 11 however it is essential that all the components of the drive unit can be fitted together in one assembly direction and thus enable a simple time-saving cost effective assembly.

The invention claimed is:

1. A drive unit for adjustment devices in motor vehicles comprising: an electric motor, a housing, a gearbox, and an electronic control device, wherein at least one component part of the electric motor which fulfills at least one of an electrical and a magnetic function of the electric motor additionally provides a mechanical function of the gearbox, and wherein the gearbox comprises a reduction gearbox with a hollow wheel fixed on the housing and having a cylindrical internally toothed spline with a first number of teeth, a driven hollow wheel which has a cylindrical internally toothed spline with a second number of teeth, and a drive core driven by the electric motor, whereby the core engages circumferentially with the internally toothed splines of the hollow wheel fixed on the housing, and of the driven hollow wheel.

2. A drive unit according to claim 1 wherein in order to form the reduction gearbox as a revolving wheel gearbox between the drive core on one side and the hollow wheel fixed on the housing and driven hollow wheel on the other side, there is a radially flexible ring which has an internal sleeve face engaging with the drive core, as well as an externally toothed spline of which at least one circumferential section engages partially with the internally toothed splines of the hollow wheel fixed on the housing and the driven hollow wheel.

3. A drive unit according to claim 2 wherein bearing sites for the drive core of the reduction gearbox are formed in a rotor disc radially spaced from a drive shaft.

4. A drive unit according to claim 3 wherein the drive core contains at least two planetary wheels arranged diametrically relative to the drive shaft and whose axes are connected to the rotor disc.

5. A drive unit according to claim 3 or 4 wherein the drive shaft is connected to a hub in which the axes of the planetary wheels are inserted radially spaced from the drive shaft.

6. A drive unit according to claim 5 wherein the hub comprises a hub plate injection moulded on the rotor disc, and of a hub cylinder which surrounds the center region of the drive shaft.

7. A drive unit according to claim 5 wherein the radially flexible ring is geometrically shaped by the planetary wheels or on the elements connected to the hub so that it engages in predeterminable manner with the counter teeth.

8. A drive unit according to claim 4 wherein the planetary wheels have hollow cylindrical bearing sleeves made of sintered material and mounted about the axes.

9. A drive unit according to claim 4 wherein the bearing sleeves have a tolerance-compensating and vibration-damping outer elastic lining.

10. A drive unit according to claim 9 wherein the tolerance compensating and vibration-damping outer elastic linings are formed as profiled ribbed wheels.

11. A drive unit according to claim 8 wherein the axes of the planetary wheels are injection moulded on a hub.

12. A drive unit according to claim 11 wherein the hub has blade elements for forming an axial ventilator with which a cooling air current is sucked in from a dry space side of the drive unit, and discharged to a wet space side of the drive unit.

13. The drive unit of claim 12 wherein the dry space side is an electric motor side and the wet space side is a driven hollow wheel side.

14. A drive unit according to claim 2 wherein the driven hollow wheel is formed as a cable roller and a gearbox side crankcase casing has openings for passing through a window lifter cable to the cable roller.

15. A drive unit according to claim 14 wherein a variable mounting for a window lifter cable is provided in a cable winding of the cable roller.

16. A drive unit according to claim 15 wherein Bowden cable supports of a Bowden cable surrounding the window lifter cable are connectable in any position directly with the gearbox side crankcase casing whereby cable mountings are formed on the cable roller so that the window lifter cable can be hung at the end of assembly.

17. A drive unit according to claim 14 wherein the cable roller and the radially flexible ring form a functional element.

18. A drive unit according to claim 1 further comprising a housing and wherein at least a part of one of the electric motor and the gearbox is supported on alternate sides of the drive unit or serves as a supporting component part for positioning the other one of the electric motor and the gearbox or the electronic control device.

19. The drive unit of claim 18, wherein the at least one component part of the electric motor comprises a drive shaft, a magnetic short circuit or a motor side crankcase casing and additionally provides a mechanical function of the gearbox.

20. A drive unit according to claim 19 wherein the magnetic short circuit of a disc rotor motor directly supports the internally toothed spline of the hollow wheel fixed relative to the housing.

21. A drive unit according to claim 20 wherein the internally toothed spline of the hollow wheel fixed on the housing is injection moulded as plastic toothing on magnetic short circuit of the disc rotor motor.

22. A drive unit according to claim 21 wherein the internally toothed spline of the hollow wheel fixed on the housing is injection moulded on a recessed toothing formed on a surface of the magnetic short circuit.

23. A drive unit according to claim 21 wherein the internally toothed spline of the hollow wheel fixed on the housing is injection moulded on at least one of radial recesses and projections of the magnetic short circuit.

24. A drive unit according to claim 19 wherein the magnetic short circuit has at least one tablet-formed circular ring segment shaped or circular ring shaped permanent magnet located and positioned on the drive unit.

25. A drive unit according to claim 24 wherein the magnetic short circuit is ring disc shaped and the permanent magnet is positioned and fixed in position by a plastic ring which surrounds a ring inside face of a ring disc shaped magnetic short circuit and which supports the internally toothed spline of the hollow wheel fixed on the housing.

26. A drive unit according to claim 24 wherein the magnetic short circuit and the permanent magnet comprise a combination of soft and hard magnetic material and are made entirely or in part in an injection moulding process.

27. A drive unit according to claim 19 wherein the magnetic short circuit after fixing the drive unit has at least in part a direct contact with one of a door inside panel, a door module or a support plate of a vehicle door.

28. A drive unit according to claim 19 wherein the magnetic short circuit is designed reinforced only in a flow-guiding region.

29. A drive unit according to claim 19 wherein a motor side crankcase casing comprises a ferromagnetic material and is part of the magnetic short circuit.

30. A drive unit according to claim 29 wherein the motor side crankcase casing is an integral constituent part of a support element of the electronic control device (15).

31. A drive unit according to claim 29 wherein the motor side crankcase casing supports a sensor device for the drive unit.

32. A drive unit according to claim 19 wherein the drive shaft forms both a motor shaft connected to a rotor disc and a gearbox shaft connected to the drive core.

33. A drive unit according to claim 19 wherein the magnetic short circuit has fixing points for at least one of the motor side crankcase casing, a gearbox side crankcase casing and a base part housing the drive unit.

34. The drive unit of claim 19, wherein a mechanical component part provides a function of the electric motor or the electronic control device.

35. The drive unit of claim 34 wherein the mechanical component part comprises a gearbox side crankcase casing.

36. A drive unit according to claim 1 further comprising a gearbox side crankcase casing which has a bearing element whose inner region supports a drive shaft and on whose outer region the driven hollow wheel is mounted free of interaction.

37. A drive unit according to claim 5 wherein the toothed spline of the hollow wheel fixed on the housing contains a conical water drainage channel which sealingly adjoins an inner face of the driven hollow wheel facing the electric motor.

* * * * *

UNITED STATES PATENT AND TRADEMARK OFFICE
CERTIFICATE OF CORRECTION

PATENT NO. : 7,038,338 B2  Page 1 of 1
APPLICATION NO. : 10/276431
DATED : May 2, 2006
INVENTOR(S) : Helmut Sesselmann et al.

It is certified that error appears in the above-identified patent and that said Letters Patent is hereby corrected as shown below:

In the Claims

| | |
|---|---|
| Column 12, line 28 | Delete "claim 4", Insert --claim 8-- |
| Column 13, line 9 | Before "magnetic", Insert --the-- |
| Column 14, line 30 | Delete "claim 5", Insert --claim 1-- |

Signed and Sealed this

Sixteenth Day of March, 2010

David J. Kappos
*Director of the United States Patent and Trademark Office*